(12) United States Patent
Igarashi et al.

(10) Patent No.: US 8,144,677 B2
(45) Date of Patent: Mar. 27, 2012

(54) WIRELESS COMMUNICATION DEVICE AND WIRELESS COMMUNICATION METHOD

(75) Inventors: Kei Igarashi, Yokohama (JP); Akira Yamada, Yokohama (JP)

(73) Assignee: NTT DoCoMo, Inc., Chiyoda-ku, Tokyo (JP)

( * ) Notice: Subject to any disclaimer, the term of this patent is extended or adjusted under 35 U.S.C. 154(b) by 868 days.

(21) Appl. No.: 12/188,786

(22) Filed: Aug. 8, 2008

(65) Prior Publication Data

US 2009/0040991 A1    Feb. 12, 2009

(30) Foreign Application Priority Data

Aug. 8, 2007   (JP) .................................. 2007-206711

(51) Int. Cl.
    *H04W 4/00* (2009.01)
(52) U.S. Cl. ...................... 370/338; 370/310.2; 370/312; 370/349; 370/447; 455/442; 455/453; 455/501; 455/574
(58) Field of Classification Search .................. 370/338, 370/447, 311, 328; 455/574, 442, 453
    See application file for complete search history.

(56) References Cited

U.S. PATENT DOCUMENTS

| | | | |
|---|---|---|---|
| 6,788,702 B1* | 9/2004 | Garcia-Luna-Aceves et al. ............................. | 370/458 |
| 2004/0219919 A1* | 11/2004 | Whinnett et al. ............. | 455/442 |
| 2004/0253996 A1* | 12/2004 | Chen et al. .................... | 455/574 |
| 2005/0068934 A1 | 3/2005 | Sakoda | |
| 2007/0183326 A1 | 8/2007 | Igarashi et al. | |
| 2007/0201505 A1 | 8/2007 | Yamada et al. | |
| 2008/0188222 A1* | 8/2008 | Oh ................................ | 455/436 |
| 2008/0279155 A1* | 11/2008 | Pratt et al. ..................... | 370/336 |

FOREIGN PATENT DOCUMENTS

| | | |
|---|---|---|
| EP | 1 484 873 A1 | 12/2004 |
| JP | 2001-53745 | 2/2001 |
| JP | 2004-180131 | 6/2004 |
| JP | 2007-129772 | 5/2007 |
| JP | 2007-214795 | 8/2007 |
| JP | 2007-235445 | 9/2007 |

OTHER PUBLICATIONS

"Part 11: Wireless LAN Medium Access Control (MAC) and Physical Layer (PHY) specifications: Amendment: Medium Access Control (MAC) Quality of Service (QoS) Enhancements"; ANSI/IEEE std 802.11-1999; 2003 Reaff edition, pp. i to 187.
European Search Report, dated Oct. 27, 2011, 9 pages.

* cited by examiner

*Primary Examiner* — Ricky Ngo
*Assistant Examiner* — Rasheed Gidado
(74) *Attorney, Agent, or Firm* — Crowell & Moring LLP

(57) ABSTRACT

An object of the present invention is to realize a distributed autonomous transmission scheduling by using a terminal without the need to observe packets in relation to communication of other wireless terminals in a cell, such as VoIP, in which a plurality of wireless terminals that periodically transmit packets exist, thereby allowing intermittent reception during the packet observation and enabling to control power consumption of the wireless terminal as well as to reduce the load to thereby improve the communication quality. To attain the object, a VoIP terminal 100 recognizes and retains a scheduling table received by a wireless terminal that is connected to a wireless base station and that is not communicating with other wireless terminals, additionally writes terminal information of the terminal in the scheduling table at the start of communication of the terminal, and broadcasts the scheduling table.

6 Claims, 11 Drawing Sheets

F I G. 3
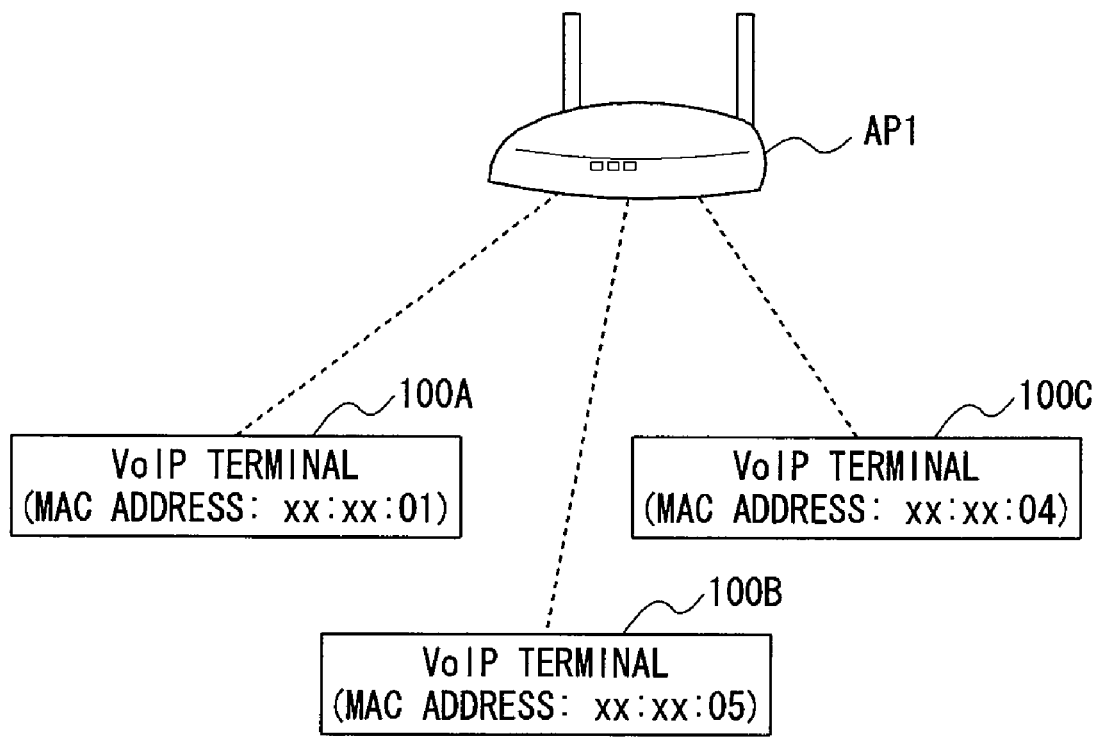

*FIG. 5*

| ORDER | TERMINAL ID |
|---|---|
| 1 | xx:xx:01 |
| 2 | xx:xx:05 |
| UPDATE TIME | 2007/07/10 16:30:10:15 |

*FIG. 6*

| ORDER | TERMINAL ID |
|---|---|
| 1 | xx:xx:01 |
| 2 | xx:xx:04 |
| 3 | xx:xx:05 |
| UPDATE TIME | 2007/07/10 16:30:40:35 |

FIG. 9

| ORDER | TERMINAL ID |
|---|---|
| 1 | xx:xx:01 |
| 2 | xx:xx:05 |
| UPDATE TIME | 2007/07/10 16:31:12:03 |

*FIG. 12*

| ORDER | TERMINAL ID |
|---|---|
| 1 | xx:xx:03 |
| 2 | xx:xx:09 |
| UPDATE TIME | 2007/07/10 16:28:09:43 |

*FIG. 13*

| ORDER | TERMINAL ID |
|---|---|
| 1 | xx:xx:03 |
| 2 | xx:xx:04 |
| 3 | xx:xx:09 |
| UPDATE TIME | 2007/07/10 16:30:35:52 |

*FIG. 14*

| ORDER | TERMINAL ID | SETTING TIME |
|---|---|---|
| 1 | xx:xx:01 | 2007/07/10 16:25:25:31 |
| 2 | xx:xx:04 | 2007/07/10 16:28:12:06 |
| 3 | xx:xx:05 | 2007/07/10 16:29:36:28 |
| UPDATE TIME | 2007/07/10 16:30:40:35 | |

WIRELESS COMMUNICATION DEVICE AND WIRELESS COMMUNICATION METHOD

BACKGROUND OF THE INVENTION

1. Field of the Invention

The present invention relates to a wireless communication device and a wireless communication method that perform a communication priority control in a wireless LAN (Local Area Network) communication system, particularly in a CSMA/CA (Carrier Sense Multiple Access with Collision Avoidance) system.

2. Description of the Related Art

In a CSMA/CA system, a terminal performs virtual carrier sensing for a certain random period before transmission and checks whether another terminal is communicating with a wireless base station. If another terminal is communicating with a wireless base station, the terminal waits for the completion of the communication and then performs actual packet transmission. All terminals have equal rights to transmission.

The virtual carrier sensing denotes an act of generating a random number within a predetermined CW (Contention Window) after a channel has become idled for an IFS (Inter Frame Space) period, determining a random period based on the random number, and performing a back-off control in the random period.

The back-off control denotes a control in which a calculated random value is set as an initial value, the value is reduced along with a lapse of time, and actual packet transmission is performed when the value becomes zero. The IFS is defined by the IEEE 802.11 wireless LAN standard and is a specific period in which an idle detection should be performed prior to the transmission.

The CW is a maximum value of the random value that can be adopted in the back-off and is a parameter required to realize user multiplexing. The IEEE 802.11 defines a minimum value CWmin and a maximum value CWmax of the CW. A random value is calculated using the value of CWmin in the back-off of the first transmission, and the back-off is performed after doubling the CW in every retransmission. The CWmax denotes an upper limit of the CW.

The back-off dependent on the randomness enables a plurality of terminals to share the same channel for communication. However, in the system, a plurality of terminals may simultaneously transmit packets. In that case, a packet collision occurs and the packets are not appropriately received, resulting in the degradation of the communication quality. Particularly, due to the above reasons, the transmission quality is significantly degraded in a real-time application such as the VoIP (Voice over Internet Protocol).

An example of a conventional technology related to the priority control in such a communication system includes the EDCA (Enhanced Distributed Channel Access) defined in IEEE 802.11e as shown in Part 11: Wireless LAN Medium Access Control (MAC) and Physical Layer (PHY) specifications: Amendment 7: Medium Access Control (MAC) Quality of Service (QoS) Enhancements. In the EDCA, any one of four types of priorities is applied to packets, respectively, and packet transmission rights are preferentially given to the packets with high priorities by shortening the transmission latency of the IFS, CWmin, CWmax, and so forth. This allows a relative priority control in a communication environment where various applications such as voice and data are mixed.

However, the conventional EDCA method only provides a relative transmission priority order of the packets with different priorities. The method is a technique that does not contribute to the quality assurance or granting of priority among terminals that transmit packets with the same priority. Therefore, the possibility of an occurrence of packet collision caused by a plurality of terminals simultaneously transmitting the packets with the same priority cannot be inhibited. When the packet collision occurs, there is a delay even if the retransmission succeeds, and a packet loss occurs if the retransmission fails. Furthermore, when a plurality of terminals perform the back-off to obtain the packet transmission rights, there is a transmission latency or a delay for obtaining the transmission rights for a terminal deprived of the retransmission rights by other terminals. The incidence of the disadvantages is higher as the number of the terminals increases. Particularly, the delay or the packet loss generated by the disadvantages leads to a significant degradation of quality in a real-time application represented by the VoIP.

An example of a method for solving such disadvantages includes a technology for controlling the packet collision by setting packet transmission right obtaining priority periods with different timings among wireless terminals for each VoIP packet generation cycle as shown in JP 2007-214795 A. Further, an example of a schedule setting technology of the priority period such as the one described in JP 2007-235445 A which includes JP 2007-214795 A. These technologies allow the terminals to perform distributed autonomous transmission scheduling, thereby realizing smooth VoIP communication.

However, the terminals have to always or periodically receive downlink packets for other terminals from an AP (Access Point) in the technology of JP 2007-235445 A. In other words, packets in relation to communication of other terminals have to be observed in a cell, such as VoIP, in which a plurality of wireless terminals that periodically transmit packets exist. Therefore, the intermittent reception is impossible during the packet observation, and battery consumption (power consumption) is large because the intermittent reception cannot be performed. Additionally, a large load is imposed on a terminal that continues to receive (continues to observe) downlink packets for other STAs (STAtion). In case of the overload, the packet transmission and reception process of the station may be affected by a delay or other reasons.

SUMMARY OF THE INVENTION

The present invention has been made in view of the foregoing problems, and an object of the present invention is to provide a wireless communication device and a wireless communication method capable of realizing distributed autonomous transmission scheduling only by a terminal without the need to observe packets in relation to communication of other wireless terminals in a cell, such as VoIP, in which a plurality of wireless terminals that periodically transmit packets exist, thereby allowing intermittent reception during the packet observation and enabling to control power consumption of the wireless terminal as well as to reduce the load to thereby improve the communication quality.

To attain the object, a first aspect of the present invention provides a wireless communication device that transmits and receives packets based on a packet transmission system for allocating a radio bandwidth by virtual carrier sensing, the wireless communication device comprising: a first transmitting means for periodically or occasionally transmitting a scheduling table, wherein a transmission order written by at least one of a plurality of wireless communication devices, to a wireless base station; a recognizing and retaining means for recognizing and retaining a scheduling table received when the wireless communication device is connected to the wireless base station and is not communicating with other wireless communication device; a second transmitting means for additionally writing information of the wireless communication device to the scheduling table which is retained by the recognizing and retaining means at the beginning of communication and for transmitting the additionally-written scheduling table at least once; an updating means for updating the retained scheduling table, when an update time of another scheduling table received from the wireless base station is later than an update time of the retained scheduling table and another transmission order received from the wireless base station is different from the transmission order in the retained scheduling table; and a third transmitting means for communicating after setting an exclusive or preferential bandwidth available period in accordance with the scheduling table updated by the updating means.

The configuration can realize distributed autonomous transmission scheduling only by the terminal without the need to observe packets in relation to communication of other wireless terminals. Therefore, the configuration allows intermittent reception during the packet observation and enables to control power consumption of the wireless terminal as well as to reduce the load to thereby improve the communication quality.

In the above configuration, the updating means may deletes the information of the wireless communication device from the retained scheduling table immediately before transition to a state of being connected only to the wireless base station or immediately after an end of communication, after at least one of the plurality of wireless communication devices that has been in communication ends the communication in accordance with the scheduling table; and the third transmitting means transmits the scheduling table from which the information is deleted, at least once.

Conventionally, if a wireless terminal arbitrarily ends communication, the transmission priority period of the other wireless terminal is removed between the transmission priority periods of a plurality of wireless terminals in communication. Furthermore, if another wireless terminal exists, an interrupt may be generated by packet transmission from the terminal. The generation of the interrupt may cause a problem that a sequence of transmitting in order according to the schedule falls apart. The above configuration deletes the terminal information from the scheduling table, thereby preventing the problem from occurring.

In the above configuration, the updating means may deletes the information of the own wireless communication device from the scheduling table when at least one of the plurality of wireless communication devices in communication moves, while a communication state being maintained, from a cell which is a current communication area of the wireless base station to another cell having another wireless base station in accordance with the scheduling table; and the third transmitting means transmits the scheduling table from which the information is deleted, to the wireless base station at least once.

Conventionally, if a wireless terminal arbitrarily moves the cell, the transmission priority period of the other wireless terminal is removed between the transmission priority periods of a plurality of wireless terminals in communication. Furthermore, if another wireless terminal exists, an interrupt may be generated by packet transmission from the terminal. The generation of the interrupt may cause a problem that a sequence of transmitting in order according to the schedule falls apart. The above configuration deletes the terminal information from the scheduling table, thereby preventing the problem from occurring.

In the above configuration, the first transmitting means communicates with a random accessing by the virtual carrier sensing for a predetermined time, after the wireless communication device moves to another cell; and the second transmitting means additionally writes the information of the wireless communication device in the scheduling table received from another wireless communication device while random accessing after the wireless communication device moves to another cell and transmits the additionally-written scheduling table to the wireless base station at least once.

According to the configuration, the plurality of wireless base stations in the cell after the movement receive the additionally written scheduling table, and the other wireless terminals belonging to the cell update the scheduling table to the new scheduling table. Therefore, the other wireless terminals can continue to communicate based on the updated scheduling table.

In the above configuration, a transmission valid period that becomes invalid after a lapse of a predetermined period may be written in the retained scheduling table.

The configuration can prevent an unnecessary transmission period for a wireless terminal that has exited the cell from being continuously set after the wireless terminal has exited the cell.

A second aspect of the present invention provides a wireless communication method for transmitting and receiving packets based on a packet transmission system for allocating a radio bandwidth by virtual carrier sensing, the wireless communication method comprising: a first step for periodically or occasionally transmitting a scheduling table, wherein a transmission order written by at least one of a plurality of wireless communication devices, to a wireless base station; a second step for recognizing and retaining a scheduling table received when the wireless communication device is connected to the wireless base station and is not communicating with other wireless communication device; a third step for additionally writing information of the wireless communication device to the scheduling table which is retained by the recognizing and retaining means at the beginning of communication and for transmitting the additionally-written scheduling table at least once; a fourth step for updating the retained scheduling table, when an update time of another scheduling table received from the wireless base station is later than an update time of the retained scheduling table and another transmission order received from the wireless base station is different from the transmission order in the retained scheduling table; and a fifth step for communicating after setting an exclusive or preferential bandwidth available period in accordance with the scheduling table updated at the fourth step.

The method realizes distributed autonomous transmission scheduling only by a terminal without the need to observe packets in relation to communication of other wireless terminals. Therefore, the method allows intermittent reception during the packet observation and enables to control power consumption of the wireless terminal as well as to reduce the load to thereby improve the communication quality.

As described, the present invention is capable of realizing distributed autonomous transmission scheduling only by a terminal without the need to observe packets in relation to communication of other wireless terminals in a cell, such as VoIP, in which a plurality of wireless terminals that periodically transmit packets exist, thereby allowing intermittent reception during the packet observation and enabling to control power consumption of the wireless terminal as well as to reduce the load to thereby improve the communication quality.

BRIEF DESCRIPTION OF THE DRAWINGS

FIG. 3 is a block diagram of a configuration of a wireless LAN network using the VoIP terminals according to the first embodiment;

FIG. 5 is a configuration diagram of a scheduling table of the VoIP terminal;

FIG. 6 is a configuration diagram of a scheduling table of the VoIP terminal;

FIG. 9 is a configuration diagram of a scheduling table of the VoIP terminal;

FIG. 12 is a configuration diagram of a scheduling table of the VoIP terminal;

FIG. 13 is a configuration diagram of a scheduling table of the VoIP terminal; and FIG. 14 is a configuration diagram of a scheduling table example when the VoIP terminal moves to another cell.

DETAILED DESCRIPTION OF THE PREFERRED EMBODIMENTS

Figure 1:
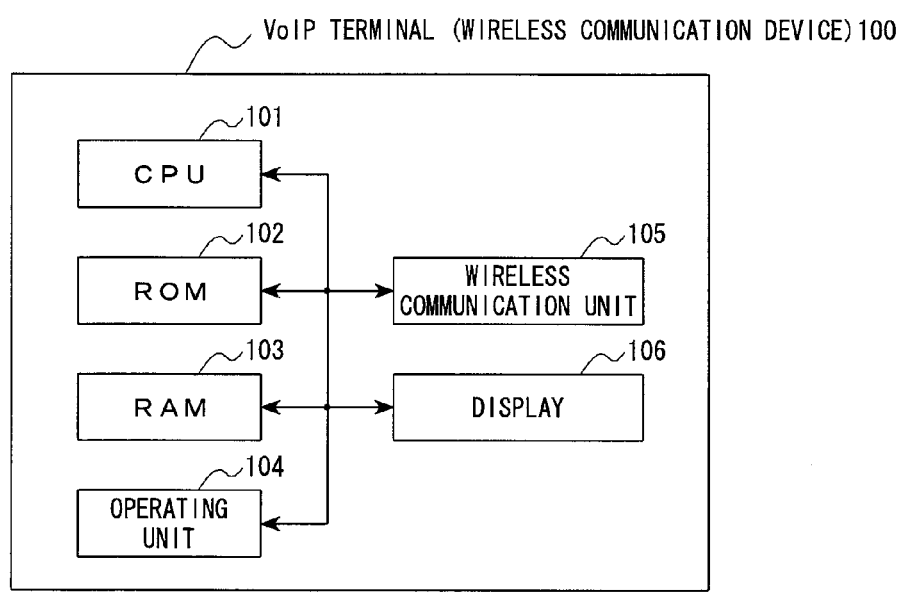
FIG. 1 is a block diagram of a hardware configuration of a VoIP terminal according to a first embodiment of the present invention.

The embodiments of the present invention will now be described with reference to the drawings. Corresponding elements are designated with like reference numerals throughout the drawings in the present specification, and the description of the overlapping parts will be appropriately omitted.

First Embodiment

FIG. 1 is a block diagram of a hardware configuration of a VoIP terminal according to a first embodiment of the present invention. The present embodiment describes a scenario in which a VoIP terminal (wireless communication device) 100 starts VoIP communication.

As shown in FIG. 1, the VoIP terminal 100 comprises: a CPU 101 as an information processing device; a ROM 102 and a RAM 103 as a compact hard disk or a semiconductor memory device; an operating unit 104 such as a key button for a user to operate and input information; a wireless communication unit 105 capable of wireless communication by a CSMA/CA system; and a display 106 formed of liquid crystal, organic EL, or the like.

Figure 2:
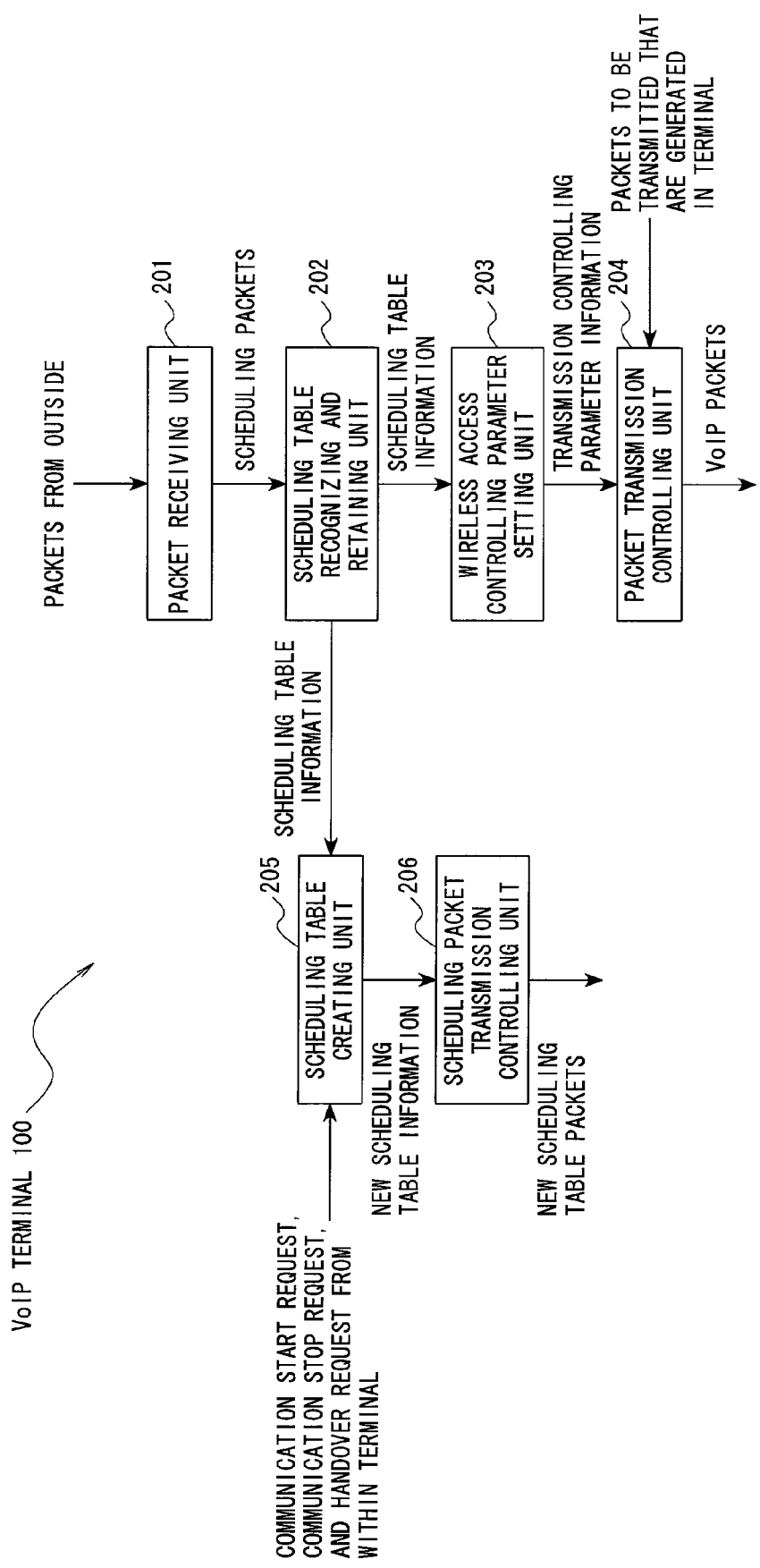
FIG. 2 is a functional block diagram of the VoIP terminal according to the first embodiment.

As shown in a functional block diagram of FIG. 2, the VoIP terminal 100 includes a processing function comprising a packet receiving unit 201, a scheduling table recognizing and retaining unit (recognizing and retaining means) 202, a wireless access controlling parameter setting unit 203, a packet transmission controlling unit 204 (first transmitting means), a scheduling table creating unit (updating means) 205, and a scheduling packet transmission controlling unit (third transmitting means) 206. The packet transmission controlling unit 204 constitutes second transmitting means in collaboration with the wireless access controlling parameter setting unit 203.

The packet receiving unit 201 is mounted on the wireless communication unit 105 and includes a function for receiving packets from an AP (Access Point) which is not shown.

The scheduling table recognizing and retaining unit 202, which is mounted on the CPU 101, the ROM 102, or the RAM 103, receives the scheduling packets from the packet receiving unit 201, then recognizes and retains a scheduling table described in the packets.

The wireless access controlling parameter setting unit 203, mounted on the wireless communication unit 105, receives scheduling table information from the scheduling table recognizing and retaining unit 202 and uses the table information to set parameters in relation to the actual packet transmission.

The packet transmission controlling unit 204 is mounted on the wireless communication unit 105 and transmits transmission packets generated inside the present VoIP terminal 100 based on the parameters set by the wireless access controlling parameter setting unit 203.

The scheduling table creating unit 205, which is mounted on the CPU 101, the ROM 102, or the RAM 103, creates and updates a new scheduling table based on the scheduling table at the time obtained from the scheduling table recognizing and retaining unit 202 when the terminal desires to start new communication, stop the communication, or hand over the communication.

The scheduling packet transmission controlling unit 206, mounted on the wireless communication unit 105, receives the new scheduling table information created by the scheduling table creating unit 205 and transmits the new scheduling table information to an AP by packets (new scheduling table packets).

As shown in FIG. 3, it is assumed that an AP (Access Point) 1 as a base station of a wireless LAN as well as a VoIP terminal 100A (MAC address xx:xx:01), a VoIP terminal 100B (MAC address xx:xx:05), and a VoIP terminal 100C (MAC address xx:xx:04) as terminals of the wireless LAN mounted with IEEE 802.11b, 802.11e EDCA, and the present method constitute a wireless LAN network.

It is also assumed that the VoIP terminals 100A and 100B are already communicating through VoIP and that the VoIP terminal 100C is connected to the AP 1 but is not communicating through VoIP at this point. Although only three wireless terminals are described for the simplification of the description, any appropriate number of wireless terminals may exist. In the present embodiment, the VoIP codec periods of the VoIP terminals 100A, 100B, and 100C are all 20 ms.

Under these conditions, a scheduling method of the present technology when the VoIP terminal 100C starts the VoIP communication will be described with reference to a sequence diagram shown in FIG. 4.

Figure 4:
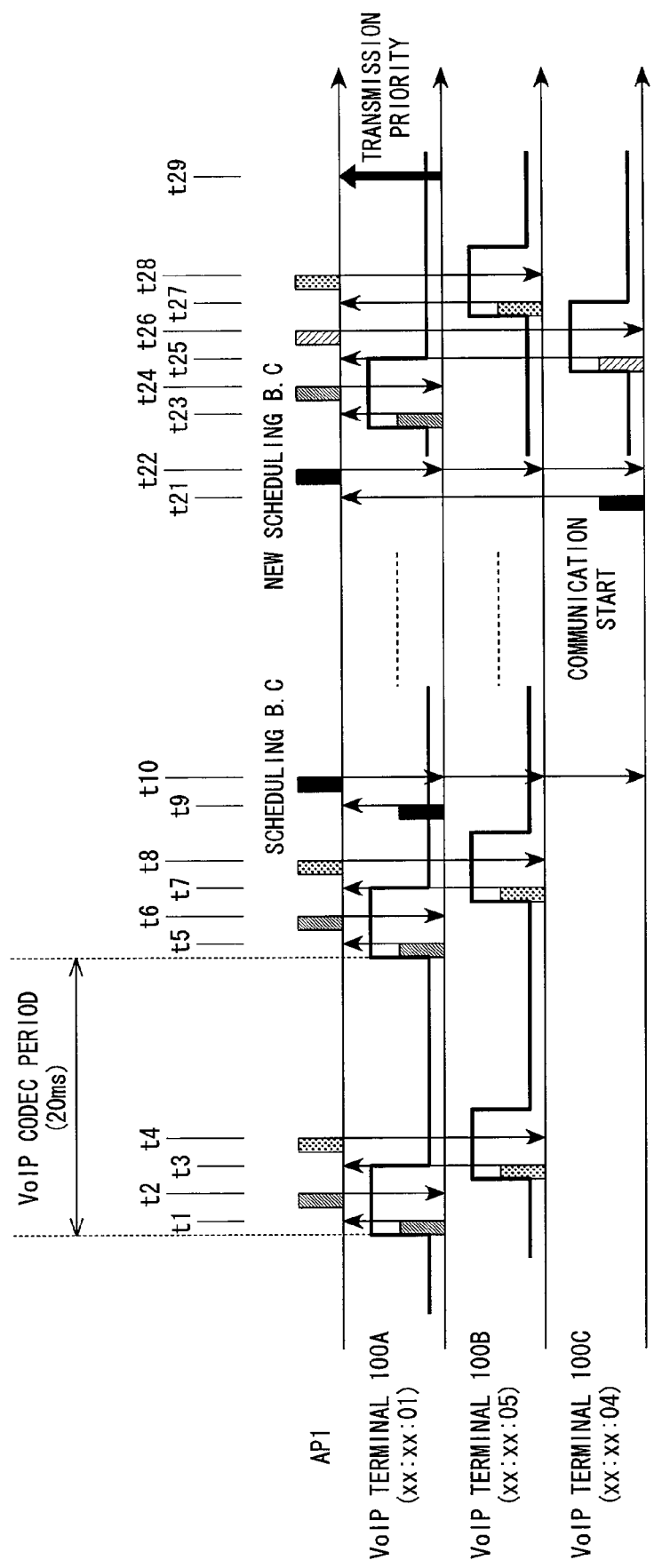
FIG. 4 is a sequence diagram for describing a scheduling method at the start of VoIP communication of the VoIP terminals according to the first embodiment.

FIG. 4 illustrates a sequence in which the VoIP terminals 100A and 100B communicate with the AP 1 by VoIP packets as shown with times t1 to t8, while the VoIP terminal 100C participates later as shown with a time t21.

The sequence diagram further depicts transmission priority periods (convex parts) of the VoIP terminals 100A, 100B, and 100C. The transmission priority periods are periods set up for the terminals to be able to transmit packets with priority over other terminals in accordance with the scheduling table. The VoIP terminals 100A and 100B perform transmission in the times t1 to t8 in accordance with already created and shared scheduling table.

In the present technology, broadcast packets storing the scheduling tables describing an order of transmission by the terminals in the VoIP communication are periodically transmitted. The transmission is performed at times t1, t5, and t23 in the VoIP terminal 100A, at times t3, t7, and t27 in the VoIP terminal 100B, and at a time t25 in the VoIP terminal 100C.

In FIG. 4, the VoIP terminal 100A transmits the scheduling table at a time t9. As shown with a time t10, not only the VoIP terminal 100B in VoIP communication, but also the VoIP terminal 100C that is not in VoIP communication but connected to the AP 1 receives the scheduling table packets transmitted by the VoIP terminal 100A. In this way, the terminal 100C that is not in VoIP communication can also recognize the VoIP communication schedule in the cell. The scheduling table transmitted at this point may have, for example, a MAC address as a terminal ID as shown in FIG. 5.

Assuming that the terminal 100C needs to perform VoIP communication as shown with the time t21 because of reasons such as the user having the VoIP terminal 100C starts VoIP communication or the terminal 100C receives a call, in this case, the VoIP terminal 100C creates a new table as shown in FIG. 6 in which the MAC address of the terminal is additionally written in the already held scheduling table as shown in FIG. 5.

More specifically, the terminal 100C transmits the scheduling packets described with the new scheduling table by broadcasting at the time t21. The broadcast packets are relayed by the AP 1 and received by the VoIP terminals 100A and 100B at a time t22. An update time may also be described in the scheduling table.

The update time denotes time information described when a terminal that updates the table actually rewrites the scheduling table. The VoIP terminals 100A and 100B update the scheduling tables held in the terminals when the update time of the received scheduling table is newer than the update time of the table held by the terminal and different from the order of transmission.

As a result, the VoIP terminals 100A, 100B, and 100C share the new scheduling table. The VoIP terminals 100A, 100B, and 100C then set transmission periods of the terminals based on the new scheduling table as shown with the times t23, t25, and t27 and transmit VoIP packets based on the transmission periods. This realizes an update of the scheduling table when a new terminal starts communicating.

Although the VoIP terminal 100C transmits the scheduling table only once in the present embodiment, the VoIP terminal 100C may transmit the scheduling table a plurality of times. The VoIP terminal 100C may also periodically broadcast the scheduling table. In this way, even if there is a terminal that has failed to receive the first broadcast packets of the scheduling table, the terminal can succeed in receiving the broadcast packets in a second or subsequent transmission. Although the above example is an example of the terminal periodically broadcasting the scheduling table, any of the following methods may be employed.

More specifically, a terminal that is connected to the AP but not in communication may periodically broadcast the scheduling table. In the present embodiment, the scheduling table may be broadcasted when the VoIP terminal 100C is in the idle state.

Figure 7:
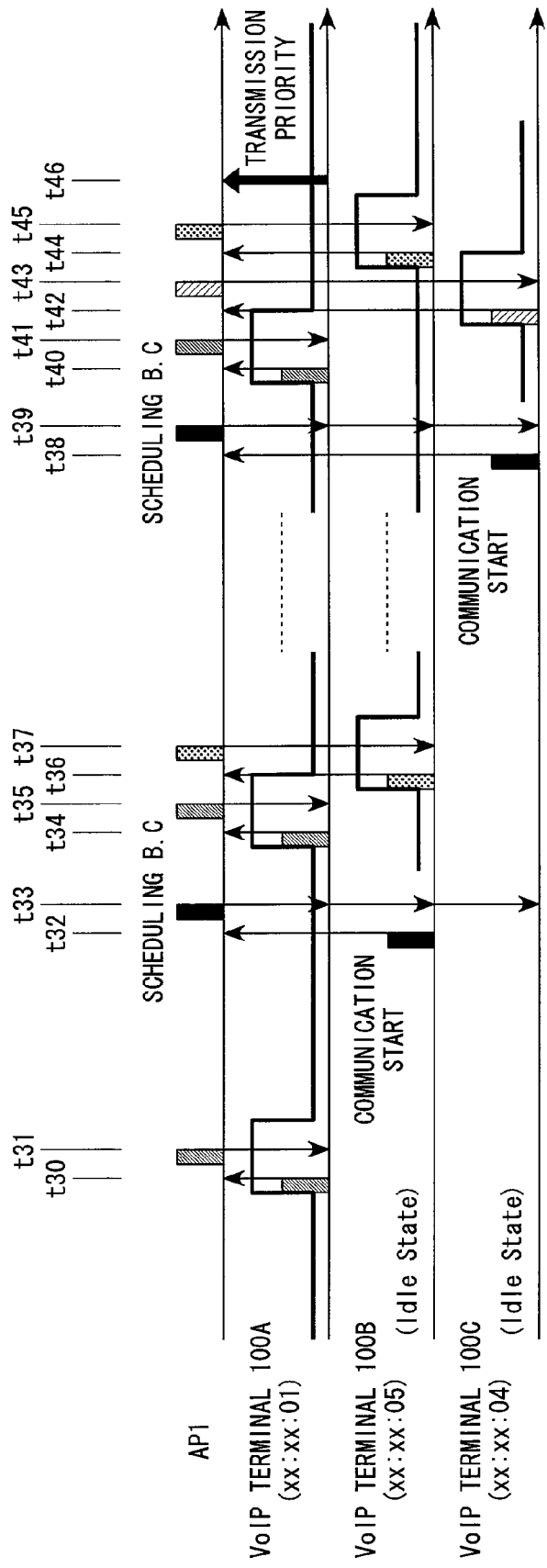
FIG. 7 is a sequence diagram at the start of new communication of the VoIP terminals according to the first embodiment.

Alternatively, the scheduling table may not be periodically broadcasted. In other words, the scheduling table may be broadcasted only when new communication is started. In this case, the sequence would be as shown in FIG. 7.

As shown with times t30 and t31, it is assumed that only the VoIP terminal 100A is in VoIP communication first. The VoIP terminal 100B then starts communicating at a time t32. At that point, as shown with a time t33, the VoIP terminal 100C can receive the scheduling packets transmitted by the VoIP terminal 100B by broadcasting at the start of communication.

Subsequently, the VoIP terminal 100C creates a new scheduling table upon the start of communication as shown with a time t38 and only has to transmit the new scheduling table through the AP 1 by broadcasting as shown with a time t39.

This method is advantageous in that the overhead is small because the scheduling table does not have to be periodically transmitted. However, the scheduling table may not be shared if there is a terminal that has failed in the reception because the reception of the broadcast packets cannot be checked as the receiver does not return Ack (acknowledgment) packets.

On the other hand, although the overhead becomes large as the scheduling table is transmitted, the method of periodically broadcasting the scheduling table achieves higher reliability for all terminals to receive the scheduling table by transmitting the scheduling table for a number of times.

Second Embodiment

In the present embodiment, an application example of the present technology in which the VoIP terminal 100 in communication stops communication and returns to the idle state will be described.

Each VoIP terminal described in the present invention comprises a hardware configuration shown in FIG. 1 and functional blocks shown in FIG. 2. The configuration example of the wireless LAN network in the present embodiment is similar to the one in FIG. 3.

Furthermore, the VoIP terminals 100A, 100B, and 100C perform VoIP packet communication with the AP 1 in accordance with the scheduling table shown in FIG. 6. Although only three terminals 100A, 100B, and 100C are described for the simplification of the description, any appropriate number of wireless terminals may exist. In the present embodiment, the VoIP codec periods of the VoIP terminals 100A, 100B, and 100C are all 20 ms.

A scheduling method in the present technology in which the VoIP terminal 100C stops VoIP communication under these conditions will be described with reference to FIG. 8.

Figure 8:
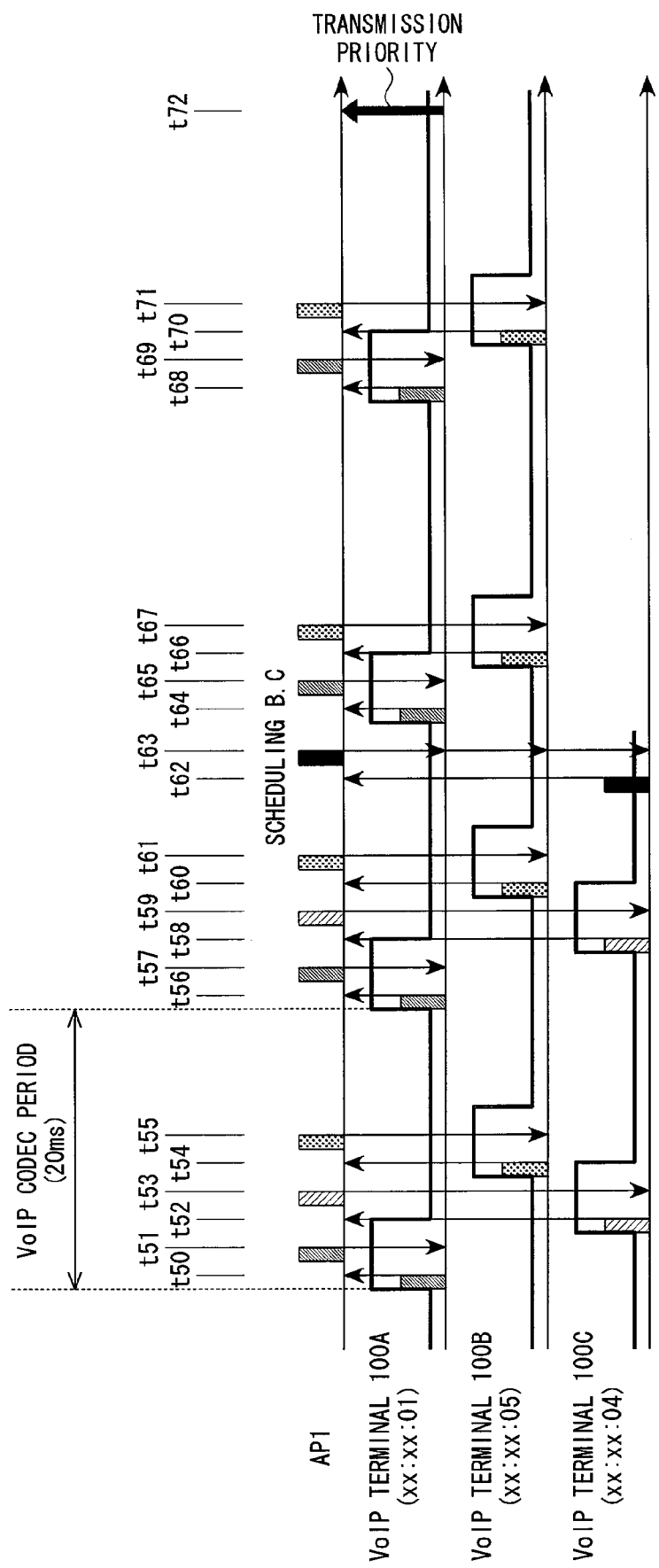
FIG. 8 is a sequence diagram for describing a scheduling method when VoIP communication of a VoIP terminal is stopped according to a second embodiment of the present invention.

FIG. 8 illustrates a sequence in which the VoIP terminals 100A, 100B, and 100C communicate with the AP 1 by VoIP packets as shown with times t50 to t61, and the VoIP terminal 100C later stops the VoIP communication as shown with a time t62. The sequence diagram further depicts transmission priority periods (convex parts) of the VoIP terminals 100A, 100B, and 100C.

When the VoIP terminal 100C stops the VoIP communication, the terminal 100C transmits a new scheduling table, in which the terminal information is removed, by broadcasting through the AP 1 as shown with times t62 and t63. Thus, a scheduling table described with information of only the VoIP terminals 100A and 100B as shown in FIG. 9 is transmitted.

The VoIP terminal 100C may transmit the scheduling table immediately before the end of or immediately after the actual end of the VoIP communication. The scheduling table may be transmitted once or any appropriate number of times. This enables to inform the VoIP terminals 100A and 100B that the VoIP terminal 100C has ended communicating. The VoIP terminals 100A and 100B continue communicating based on the updated scheduling table as shown with times t64 to t71.

If the scheduling table at the end of communication is not transmitted, the following problems occur. If the VoIP terminal 100C arbitrarily ends communication, the transmission priority period of the VoIP terminal 100C is removed between the transmission priority periods of the VoIP terminal 100A and 100B. Furthermore, when a terminal that is not mounted with the present technology other than the terminals 100A, 100B, and 100C exists, the terminal may generate an interrupt by packet transmission. The sequence of transmitting in order according to the schedule may fall apart if an interrupt is generated. The second embodiment can prevent the problems from occurring.

Alternatively, the VoIP terminal 100C may end the VoIP communication without transmitting anything. This is advantageous in that the overhead of transmitting the scheduling table is reduced.

Third Embodiment

An application example of the present technology, in which a terminal in communication moves between cells in the communication state, will be described in the present embodiment.

It is assumed that each VoIP terminal described in the present embodiment comprises the hardware configuration shown in FIG. 1 and the functional blocks shown in FIG. 2. It is also assumed that the configuration example of the wireless LAN network in the present embodiment has a configuration shown in FIG. 10.

Figure 10:
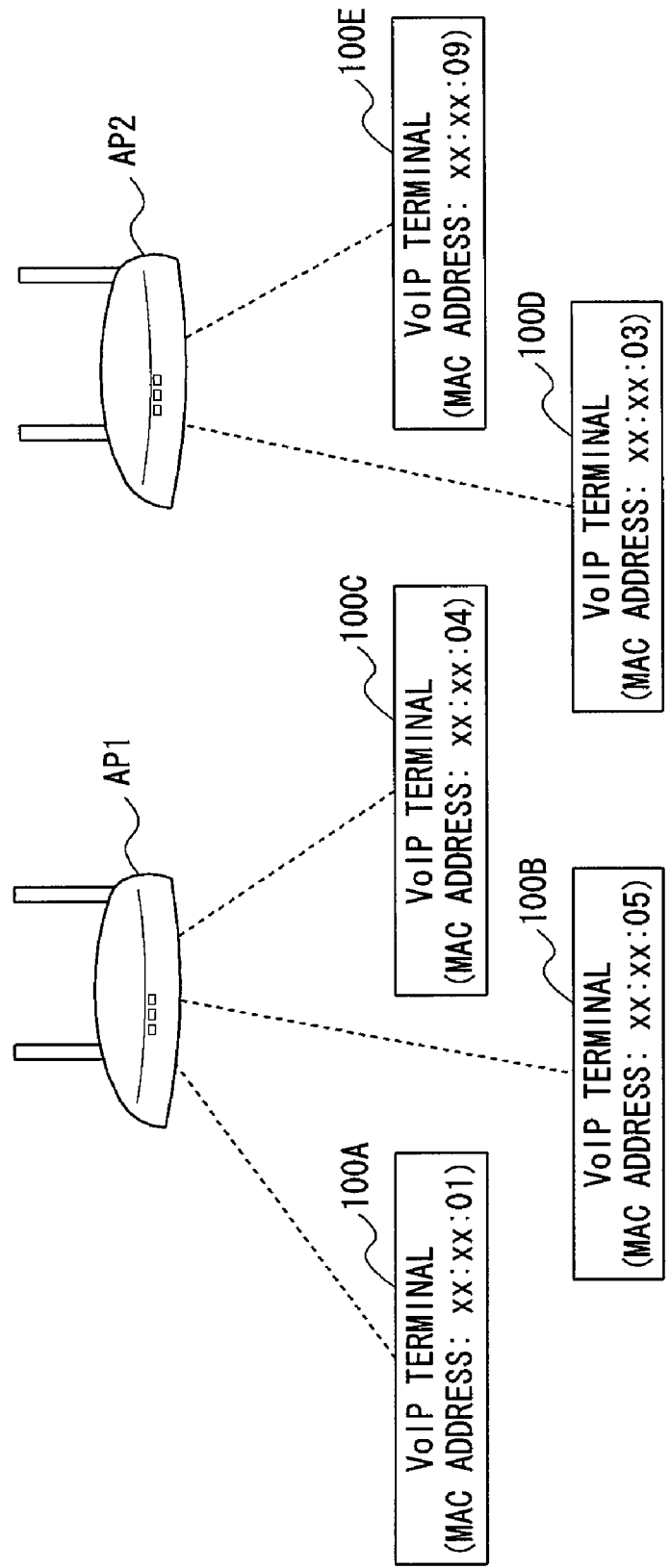
FIG. 10 is a block diagram of a configuration of a wireless LAN network using the VoIP terminals according to the second embodiment.

Two cells not shown exist in FIG. 10, and the AP 1 and an AP 2 as base stations of the wireless LAN exist in respective cells. The cell under the control of the AP 1 refers to a first cell, while the cell under the control of the AP 2 refers to a second cell. In the present embodiment, all terminals are VoIP terminals of wireless LAN mounted with IEEE 802.11b, 802.11e EDCA, and the present method.

The VoIP terminal 100A (MAC address xx:xx:01), the VoIP terminal 100B (MAC address xx:xx:05), and the VoIP terminal 100C (MAC address xx:xx:04) exist in the first cell. A VoIP terminal 100D (MAC address xx:xx:03) and a VoIP terminal 100E (MAC address xx:xx:09) exist in the second cell. Each of the first cell and the second cell constitutes a wireless LAN network.

The VoIP terminals 100A, 100B, and 100C perform VoIP packet communication with the AP 1 in the first cell in accordance with the scheduling table shown in FIG. 6. The VoIP terminals 100D and 100E perform VoIP packet communication with the AP 2 in the second cell in accordance with a schedule shown in FIG. 11. Although only five terminals 100A, 100B, 100C, 100D, and 100E are described for the simplification of the description, any appropriate number of wireless terminals may exist. The VoIP codec periods of the terminals are all 20 ms in the present embodiment. Although two cells exist in the present embodiment, any appropriate number of the cells may exist.

A scheduling method in the present technology in which the VoIP terminal 100C moves from the first cell to the second cell under these conditions with the VoIP communication being maintained will be described with reference to FIG. 11.

Figure 11:
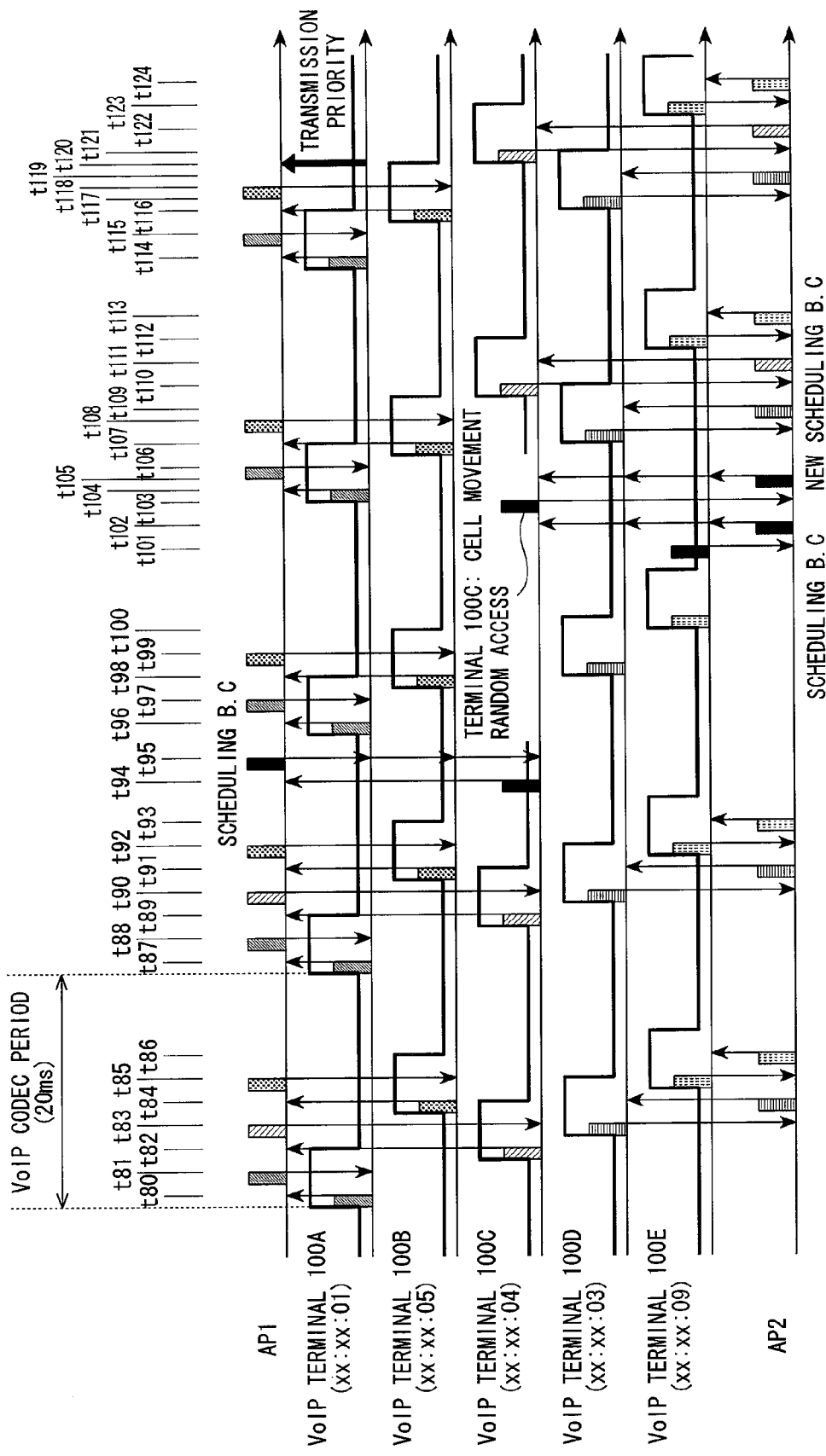
FIG. 11 is a sequence diagram for describing a scheduling method during VoIP communication of the VoIP terminals according to a third embodiment of the present invention.

FIG. 11 illustrates a sequence in which the VoIP terminals 100A, 100B, and 100C communicate with the AP 1 by VoIP packets in accordance with the scheduling table shown in FIG. 6, the VoIP terminals 100D and 100E communicate with the AP 2 by VoIP packets in accordance with the scheduling table shown in FIG. 11, and as shown with a time t103, the VoIP terminal 100C later moves to the second cell with the VoIP communication maintained. The present sequence diagram further depicts transmission priority periods (convex parts) of the terminals 100A, 100B, 100C, 100D, and 100E.

Once the VoIP terminal 100C mounted with the present technology moves from the first cell to the second cell with the VoIP communication maintained, the VoIP terminal 100C first transmits a scheduling table, in which the terminal information of the VoIP terminal 100C is removed from the scheduling table of FIG. 6, by broadcasting in order to inform other VoIP terminals 100A and 100B in the first cell that the VoIP terminal 100C will move out from the first cell. The scheduling table can be a table which is shown in FIG. 9, for example.

This enables to inform the VoIP terminals 100A and 100B a fact that the VoIP terminal 100C has exited the first cell, and the VoIP terminals 100A and 100B will continue communicating based on the updated scheduling table.

If the scheduling table at the end of communication is not transmitted, the following problems occur. If the VoIP terminal 100C arbitrarily exits the first cell, the transmission priority period of the VoIP terminal 100C is removed between the transmission priority periods of the VoIP terminals 100A and 100B. Furthermore, when a terminal that is not mounted with the present technology other than the VoIP terminals 100A, 100B, and 100C exists, the terminal that is not mounted with the present technology may generate an interrupt by packet transmission. The sequence of transmitting in order according to the schedule may fall apart if an interrupt is generated. The third embodiment can prevent the problems from occurring.

Alternatively, the VoIP terminal 100C may exit the first cell without transmitting anything. This is advantageous in that the overhead of transmitting the scheduling table is reduced.

Having moved to the second cell, the VoIP terminal 100C is not registered in the scheduling table of the second cell at first. Therefore, the VoIP terminal 100C performs a VoIP packet communication with the AP 2 by random access according to a normal wireless LAN access as shown with a time t103.

In the present technology, a terminal in VoIP communication periodically transmits broadcast packets stored in a scheduling table described with an order of transmission. In the second cell of the present embodiment, the VoIP terminal 100E performs the transmission as shown with times t85, t92, t101, t112, and t123. Although the VoIP terminal 100E performs the transmission, another terminal in the cell, i.e. the VoIP terminal 100D, may perform the transmission. The scheduling table can be a table which is shown in FIG. 12.

After receiving the periodically broadcasted scheduling table of the second cell, the VoIP terminal 100C updates the scheduling table shown in FIG. 12 by additionally writing the terminal information of the VoIP terminal 100C and then transmits the new scheduling table by broadcasting through the AP 2 as shown with a time t105. The new scheduling table can be a table which is shown in FIG. 13. As the terminals in the second cell receive the new scheduling table, the new scheduling table among the terminals 100C, 100D, and 100E belonging to the second cell is updated. The terminals 100C, 100D, and 100E continue communicating based on the updated scheduling table.

The transmission periods of the terminals in the scheduling table may have expiration time functions. More specifically, after a certain period has passed, the transmission period of the terminal may become invalid, and if the terminal still desires to set the transmission period, the terminal may transmit the scheduling table by broadcasting to inform other terminals.

This enables to prevent an unnecessary transmission period for an exited wireless terminal from being continuously set even after the wireless terminal has exited the cell. A transmission period setting time as shown in FIG. 14 is described as an element in a scheduling table example prior to the movement by the VoIP terminal 100C of the first cell in the present embodiment.

The wireless communication device and the wireless communication method of the present invention are suitably available when performing priority control of communication with excellent quality in a network for communication in the CSMA/CA system.

What is claimed is:

1. A wireless communication device for transmitting and receiving packets, the wireless communication device comprising:
   a first transmitting unit configured to periodically or occasionally transmit a scheduling table, in which a transmission order is written by at least one of a plurality of wireless communication devices, to a wireless base station;
   a recognizing and retaining unit configured to recognize and retain a scheduling table received when the wireless communication device is connected to the wireless base station and is not communicating with another wireless communication device;
   a second transmitting unit configured to additionally write information of the wireless communication device to the scheduling table which is retained by the recognizing and retaining unit at the beginning of communication and to transmit the additionally-written scheduling table at least once;
   an updating unit configured to update the retained scheduling table, when an update time of another scheduling table received by the wireless base station in communication is later than an update time of the retained scheduling table and another transmission order received by the wireless base station is different from the transmission order in the retained scheduling table; and
   a third transmitting unit configured to communicate during a transmission priority period set in accordance with the scheduling table updated by the updating unit to transmit the packets with a high priority.

2. The wireless communication device according to claim 1, wherein:
   the updating unit deletes the information of the wireless communication device from the retained scheduling table immediately before transition to a state of being connected only to the wireless base station or immediately after an end of communication, after at least one of the plurality of wireless communication devices that has been in communication ends the communication in accordance with the scheduling table; and
   the third transmitting unit transmits the scheduling table from which the information is deleted, at least once.

3. The wireless communication device according to claim 1, wherein:
   the updating unit deletes the information of the wireless communication device from the scheduling table when at least one of the plurality of wireless communication devices in communication moves, while a communication state being maintained, from a cell which is a current communication area of the wireless base station to another cell having another wireless base station in accordance with the scheduling table; and
   the third transmitting unit transmits the scheduling table from which the information is deleted, to the wireless base station at least once.

4. The wireless communication device according to claim 3, wherein:
   the first transmitting unit communicates, after the wireless communication device moves to another cell; and
   the second transmitting unit additionally writes the information of the wireless communication device in the scheduling table received from another wireless communication device while random accessing after the wireless communication device moves to another cell and transmits the additionally-written scheduling table to the wireless base station at least once.

5. The wireless communication device according to claim 1, wherein a transmission valid period that becomes invalid after a lapse of a predetermined period which is written in the retained scheduling table.

6. A wireless communication method for transmitting and receiving packets, the wireless communication method comprising the steps of:
   periodically or occasionally transmitting a scheduling table, in which a transmission order is written by at least one of a plurality of wireless communication devices, to a wireless base station;
   recognizing and retaining a scheduling table received when the wireless communication device is connected to the wireless base station and is not communicating with another wireless communication device;
   additionally writing information of the wireless communication device to the scheduling table which is retained by the recognizing and retaining step at the beginning of communication, and transmitting the additionally-written scheduling table at least once;
   updating the retained scheduling table, when an update time of another scheduling table received by the wireless base station in communication is later than an update time of the retained scheduling table and another transmission order received by the wireless base station is different from the transmission order in the retained scheduling table; and
   communicating during a transmission priority period set in accordance with the scheduling table updated at the updating step to transmit the packets with a high priority.

\* \* \* \* \*